United States Patent
Liu et al.

(10) Patent No.: US 11,057,257 B2
(45) Date of Patent: Jul. 6, 2021

(54) METHOD AND DEVICE FOR TIMING ALIGNMENT

(71) Applicant: Telefonaktiebolaget LM Ericsson (publ), Stockholm (SE)

(72) Inventors: Peng Liu, Beijing (CN); Junfeng Jie, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/639,929

(22) PCT Filed: Sep. 18, 2017

(86) PCT No.: PCT/CN2017/102065
§ 371 (c)(1),
(2) Date: Feb. 18, 2020

(87) PCT Pub. No.: WO2019/051831
PCT Pub. Date: Mar. 21, 2019

(65) Prior Publication Data
US 2020/0244506 A1 Jul. 30, 2020

(51) Int. Cl.
*H04L 27/26* (2006.01)

(52) U.S. Cl.
CPC ...... *H04L 27/2663* (2013.01); *H04L 27/2676* (2013.01)

(58) Field of Classification Search
CPC ....... H04L 7/0008; H04L 7/02; H04L 7/0331; G06F 1/10
USPC .................................. 375/354, 356
See application file for complete search history.

(56) References Cited

U.S. PATENT DOCUMENTS

| | | | | | |
|---|---|---|---|---|---|
| 4,843,309 | A | * | 6/1989 | Kareem | G01R 13/225 324/121 R |
| 9,506,951 | B2 | * | 11/2016 | Taratorin | G01R 13/029 |
| 2006/0012376 | A1 | | 1/2006 | Furse et al. | |
| 2007/0140323 | A1 | | 6/2007 | Patel et al. | |
| 2012/0313618 | A1 | * | 12/2012 | Phillips | G01R 31/3191 324/74 |

(Continued)

FOREIGN PATENT DOCUMENTS

| CN | 101931963 A | 12/2010 |
|---|---|---|
| CN | 102185822 A | 9/2011 |

(Continued)

OTHER PUBLICATIONS

International Search Report and Written Opinion of the International Searching Authority, PCT/CN2017/102065, dated Jun. 7, 2018, 10 pages.

(Continued)

*Primary Examiner* — Khai Tran
(74) *Attorney, Agent, or Firm* — Sage Patent Group

(57) ABSTRACT

A method and device for timing alignment are disclosed. The method includes widening spectra of two signals for timing misalignment estimation; performing cross-correlation between the two spectrum-widened signals; and estimating the timing misalignment between the two signals according to a result of the cross-correlation. Therefore, an accurate time alignment result will be obtained with low complexity. Furthermore, it will be appropriate for all types of signals including separated multi-carrier signals.

20 Claims, 5 Drawing Sheets

(56) References Cited

U.S. PATENT DOCUMENTS

| | | | |
|---|---|---|---|
| 2013/0076418 A1* | 3/2013 | Belitzer | H03F 1/3288 |
| | | | 327/161 |
| 2018/0279334 A1* | 9/2018 | Lim | H04L 27/2607 |
| 2018/0348138 A1* | 12/2018 | Shiozawa | G01J 3/0286 |

FOREIGN PATENT DOCUMENTS

| | | |
|---|---|---|
| CN | 104735713 A | 6/2015 |
| WO | 2015007593 A1 | 1/2015 |

OTHER PUBLICATIONS

Search Report Communication for European Patent Application No. 17924980.0 dated Mar. 23, 2021, 5 pages.

* cited by examiner

METHOD AND DEVICE FOR TIMING ALIGNMENT

CROSS REFERENCE TO RELATED APPLICATIONS

This application is a 35 U.S.C. § 371 national stage application of PCT International Application No. PCT/CN2017/102065 filed on Sep. 18, 2017, the disclosure and content of which are incorporated by reference herein in their entirety.

TECHNICAL FIELD

Embodiments of the present disclosure generally relate to the field of communications, and more particularly, to a method and device for timing alignment.

BACKGROUND

Timing alignment is very important in the field of communications. For example, in a digital pre-distortion (DPD) system, various error estimation loops have to be executed based on accurately aligned signals to obtain correct estimation results. Accordingly, timing alignment between a transmitted signal and a feedback signal from an observation receiver is important in the DPD system.

In order to perform timing alignment between two signals, timing misalignment between the two signals needs to be estimated accurately. Traditionally, a method for timing alignment includes following steps: first, cross-correlation is performed between the two signals; and second, a peak is detected from the result curve of the cross-correlation, and an index of the peak is regarded as the timing misalignment between the two signals.

This section introduces aspects that may facilitate a better understanding of the disclosure. Accordingly, the statements of this section are to be read in this light and are not to be understood as admissions about what is in the prior art or what is not in the prior art.

SUMMARY

The inventors found that the above traditional method is not appropriate for all types of signals. For example, signals may be transmitted by different forms of carriers, such as a single carrier, continual multi-carrier, and separated multi-carrier. For separated multi-carrier, power spectral density of a separated multi-carrier signal is a non-continual distribution, and a result curve of cross-correlation between two such signals is not smooth enough. FIG. 1 is a diagram which shows a result curve of cross-correlation between two separated multi-carrier signals. As shown in FIG. 1, there are many extreme points in the result curve. Thus a peak is difficult to be detected accurately, which will give out a wrong time alignment result with high probability.

In order to solve at least part of the above problems, methods, apparatus, devices and computer programs are provided in the present disclosure. It may be appreciated that embodiments of the present disclosure are not limited to a wireless system, but could be more widely applied to any application scenario where similar problems exist.

Various embodiments of the present disclosure mainly aim at providing methods, devices and computer programs for timing alignment between two signals. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution of timing alignment to overcome the one or more problems pointed out in the above description.

In a first aspect, there is provided a method for timing alignment. The method includes: widening spectra of two signals for timing misalignment estimation; performing cross-correlation between the two spectrum-widened signals; and estimating the timing misalignment between the two signals according to a result of the cross-correlation.

In an embodiment, the step of widening spectra of two signals for timing misalignment estimation includes: shifting the two signals in frequency according to a predetermined shift value and a predetermined stitching number, to obtain the stitching number of signals for the two signals respectively; and stitching the stitching number of signals in frequency for the two signals respectively, to obtain the two spectrum-widened signals.

In an embodiment, the step of shifting the two signals in frequency according to a predetermined shift value and a predetermined stitching number includes: shifting the two signals in frequency respectively according to n times of the shift value, to obtain (N−1) shifted signals, where n is an integer from 1 to N−1, N is the stitching number, wherein, the signal before shifting and the (N−1) shifted signals constitute the stitching number of signals for the two signals respectively.

In an embodiment, the method further includes: setting the stitching number according to a predetermined strategy; and calculating the shift value according to a maximum bandwidth among at least two carriers used for transmitting the two signals and the stitching number.

In an embodiment, the step of stitching the stitching number of signals in frequency for the two signals respectively includes: stitching the stitching number of signals in frequency in a continual mode or a non-continual mode for the two signals respectively.

In a second aspect, there is provided a device for timing alignment. The device includes a memory and a processor, wherein, the memory containing instructions which, when executed on the processor, cause the processor to: widen spectra of two signals for timing misalignment estimation; perform cross-correlation between the two spectrum-widened signals; and estimate the timing misalignment between the two signals according to a result of the cross-correlation.

In an embodiment, the processor is caused to: shift the two signals in frequency respectively according to n times of the shift value, to obtain (N−1) shifted signals, where n is an integer from 1 to N−1, N is the stitching number, wherein, the signal before shifting and the (N−1) shifted signals constitute the stitching number of signals for the two signals respectively In an embodiment, the processor is further caused to: set the stitching number according to a predetermined strategy; and calculate the shift value according to a maximum bandwidth among at least two carriers used for transmitting the two signals and the stitching number.

In an embodiment, the processor is caused to: stitch the stitching number of signals in frequency in a continual mode or a non-continual mode for the two signals respectively.

In a third aspect, there is provided a transmitter or receiver. The transmitter or receiver includes a device for timing alignment according to the second aspect.

In a fourth aspect, there is provided a computer readable storage medium storing instructions which, when executed on a processor of a device for timing alignment, cause the device for timing alignment to perform a method according to the first aspect.

According to various embodiments of the present disclosure, spectra of two signals are widened for timing misalignment estimation before a cross-correlation process and power spectral densities of the two spectrum-widened signals are uniform distributions. Therefore, the result curve of cross-correlation will be smooth enough and the peak of the result curve will be more outstanding. The peak detection will be easier and an accurate time alignment result will be obtained with low complexity. Furthermore, it will be appropriate for all types of signals including separated multi-carrier signals.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
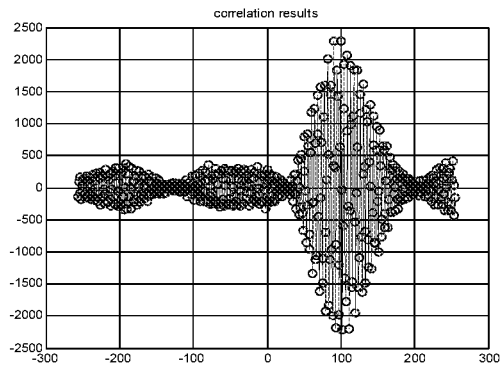
FIG. 1 is a diagram which shows a result curve of cross-correlation between two separated multi-carrier signals.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "transmitter" and "receiver" refer to any device on the transmitting side and receiving side in a communications system, for example, a network device and a terminal device.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

First Aspect of Embodiments

Figure 2:
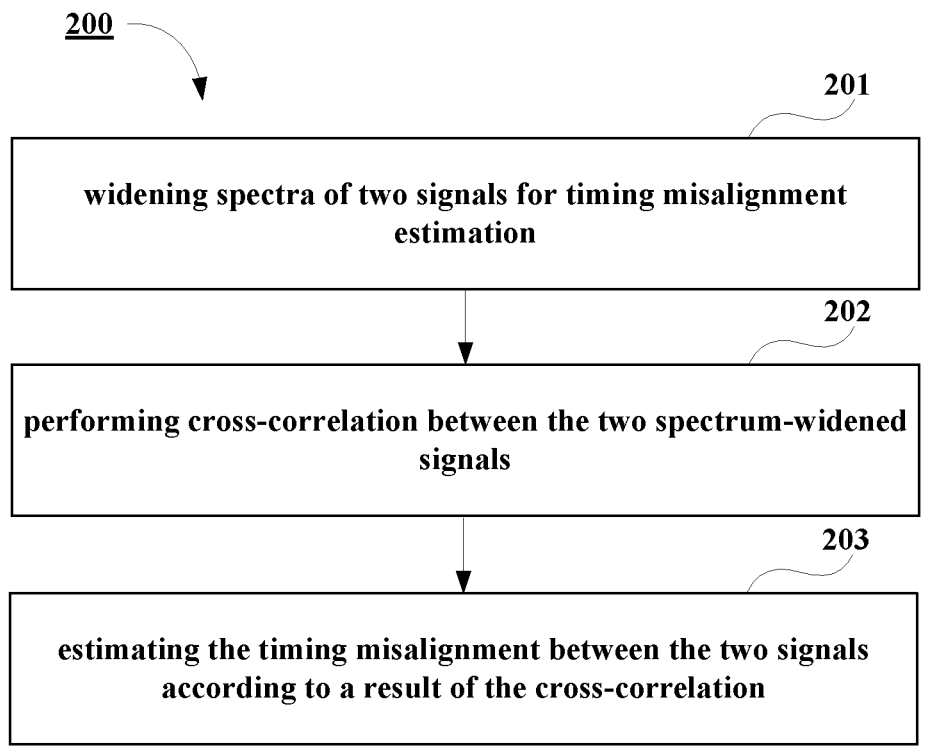
FIG. 2 is a flowchart which shows a method 200 for timing alignment in accordance with an embodiment of the present disclosure.

FIG. 2 is a flowchart which shows a method 200 for timing alignment in accordance with an embodiment of the present disclosure.

As shown in FIG. 2, the method 200 includes: widening spectra of two signals for timing misalignment estimation, at block 201; performing cross-correlation between the two spectrum-widened signals, at block 202; and estimating the timing misalignment between the two signals according to a result of the cross-correlation, at block 203.

In an embodiment, the term "two signals" refers to any two signals which need timing alignment between them. For example, a transmitted signal and a feedback signal from an observation receiver in a DPD system, or a transmitted signal and a received signal in a digital communications system.

In an embodiment, "two signals" may be any type of signal. For example, single carrier signals, continual multi-carrier signals, or separated multi-carrier signals.

Figure 3:
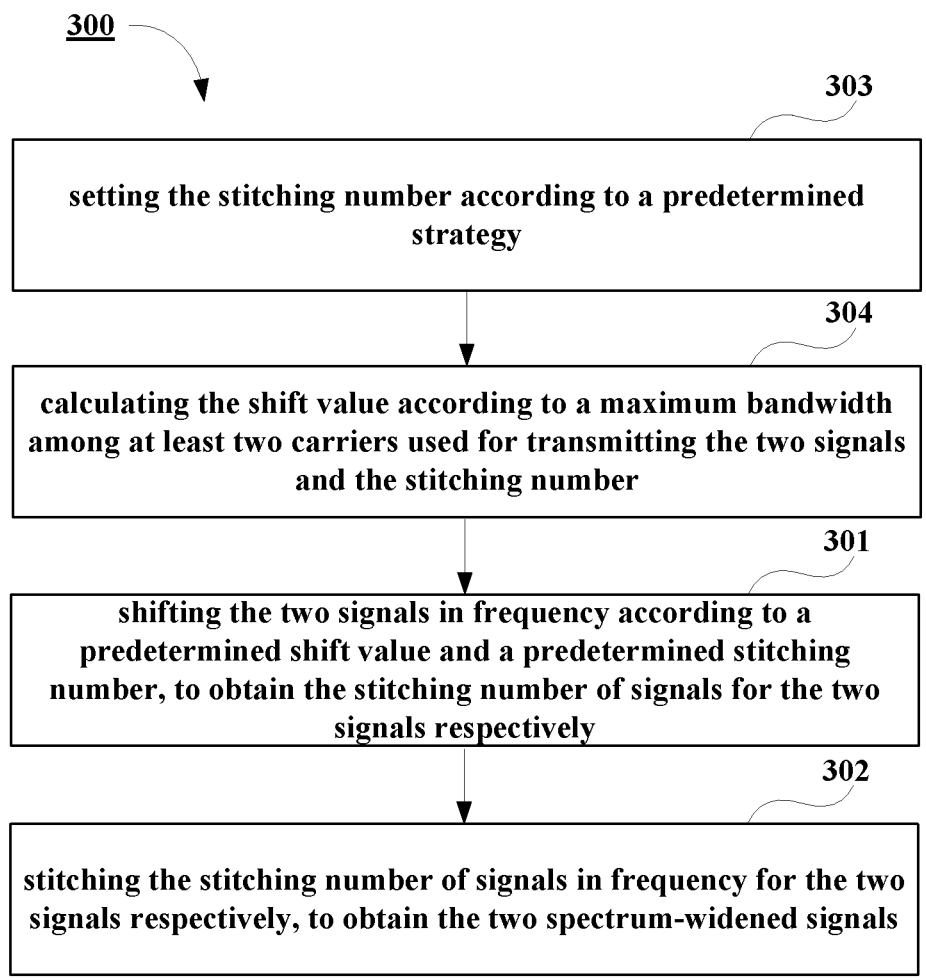
FIG. 3 is a flowchart which shows a method 300 for widening spectra of two signals for timing misalignment estimation in accordance with an embodiment of the present disclosure.

At block 201, there are various methods for widening spectra of two signals for timing misalignment estimation. FIG. 3 is a flowchart which shows a method 300 for widening spectra of two signals for timing misalignment estimation in accordance with an embodiment of the present disclosure.

As shown in FIG. 3, the method 300 includes: shifting the two signals in frequency according to a predetermined shift value and a predetermined stitching number, to obtain the stitching number of signals for the two signals respectively, at block 301; and stitching the stitching number of signals in frequency for the two signals respectively, to obtain the two spectrum-widened signals, at block 302.

At block 301, the shifting step may be performed as follows: shifting the two signals in frequency respectively according to n times of the shift value, to obtain (N−1) shifted signals, where n is an integer from 1 to N−1, N is the stitching number, wherein, the signal before shifting and the (N−1) shifted signals constitute the stitching number of signals for the two signals respectively.

In an embodiment, when shifting the two signals, two signal blocks may be cut out from the two signals respectively with a specific range in frequency. Thus the shifting and stitching will be easier to perform. However, the whole two signals may also be used for shifting and stitching in this embodiment.

According to time-frequency domain signal analysis theory, a shift in frequency domain for signal equals to a phase rotation in time domain. Thus, the spectrum shifting may be shown as:

$$x'_n = x_n \cdot e^{\frac{j2\pi f c_n}{f_s}}, n = 0, \cdots, N-1 \qquad (1)$$

Where, $x_n$ is a n-th signal block in time domain before shifting, $f_s$ is a sampling frequency of a signal block, $f_{c_n}$ is a shift distance for a n-th shifted signal block, N is the predetermined stitching number, $x_n'$ is a corresponding signal block after shifting.

In an embodiment, the predetermined shift value and the predetermined stitching number are obtained in advance.

In an embodiment, a method for obtaining the predetermined shift value and the predetermined stitching number is illustrated for the case of multi-carrier signals.

As shown in FIG. 3, the method 300 further includes: setting the stitching number according to a predetermined strategy, at block 303; and calculating the shift value according to a maximum bandwidth among at least two carriers used for transmitting the two signals and the stitching number, at block 304.

In an embodiment, the stitching number is set according to a predetermined strategy which is generated with actual requirements.

As an example, for the case of two carriers being used for transmitting the two signals respectively, the shift value is calculated according to the following formula:

$$BW_{max} \leq f_c \leq |f_1 - f_2|/N \qquad (2)$$

Where, $f_c$ is the shift value, $BW_{max}$ is the maximum bandwidth of two carriers used for transmitting the two signals, N is the predetermined stitching number, $f_1$ and $f_2$ are carrier frequency respectively of the two carriers.

In an embodiment, for the case of a single carrier being used for transmitting the two signals respectively, the shifting may be omitted.

A method performed at block 301 is illustrated above as an example and the stitching number of signals are obtained for the two signals respectively. Then the stitching number of signals may be stitched in frequency for the two signals respectively, to obtain the two spectrum-widened signals, which is performed at block 302.

In an embodiment, the term "stitch" refers to combine or splice multiple signals in frequency.

After stitching, N signal blocks will be stitched together and a spectrum-widened signal will be generated, which may be shown as:

$$y = \Sigma_{n=0}^{N-1} x_n' = \Sigma_{n=0}^{N-1} x_n \cdot e^{j2\pi f c_n/f_s} \qquad (3)$$

Where, y is the spectrum-widened signal, $x_n$ is a n-th signal block in time domain before shifting, $f_s$ is a sampling frequency of a signal block, $f_{c_n}$ is a shift distance for a n-th shifted signal block, N is the predetermined stitching number, $x_n'$ is a corresponding signal block after shifting.

In an embodiment, the stitching number of signals may be stitched in frequency in a continual mode or a non-continual mode for the two signals respectively.

Figure 4:
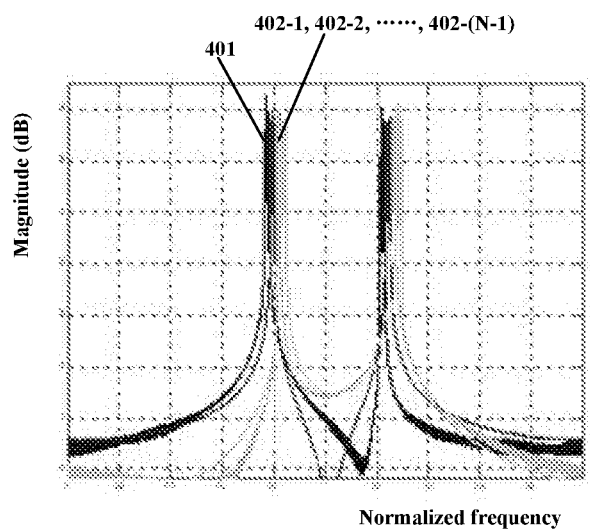
FIG. 4 is a diagram which shows a spectrum-widened signal after stitching in a continual mode in accordance with an embodiment of the present disclosure.

FIG. 4 is a diagram which shows a spectrum-widened signal after stitching in a continual mode in accordance with an embodiment of the present disclosure. As shown in FIG. 4, a curve 401 shows the signal before shifting, and curves 402-1, 402-2, . . . , 402-(N−1) show the (N−1) shifted signals. The stitching number N of signals after shifting are continual in frequency in this embodiment. For example, when the shift value is equal to the maximum bandwidth among at least two carriers used for transmitting the two signals, the stitching number of signals may be stitched in the continual mode.

Figure 5:
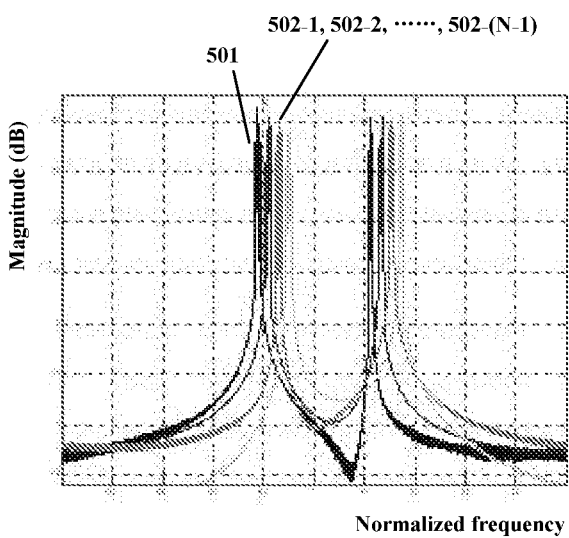
FIG. 5 is a diagram which shows a spectrum-widened signal after stitching in a non-continual mode.

FIG. 5 is a diagram which shows a spectrum-widened signal after stitching in a non-continual mode. As shown in FIG. 5, a curve 501 shows the signal before shifting, and curves 502-1, 502-2, . . . , 502-(N−1) show the (N−1) shifted signals. The stitching number of signals after shifting are non-continual in frequency in this embodiment. For example, when the shift value is greater than the maximum bandwidth among at least two carriers used for transmitting the two signals, the stitching number of signals may be stitched in the non-continual mode.

A method performed at block 201 is illustrated above as an example and two spectrum-widened signals are obtained. Then the cross-correlation is performed between the two spectrum-widened signals at block 202.

In an embodiment, various methods of cross-correlation may be used to perform the cross-correlation. For example, sliding cross-correlation is performed between the two spectrum-widened signals.

Figure 6:
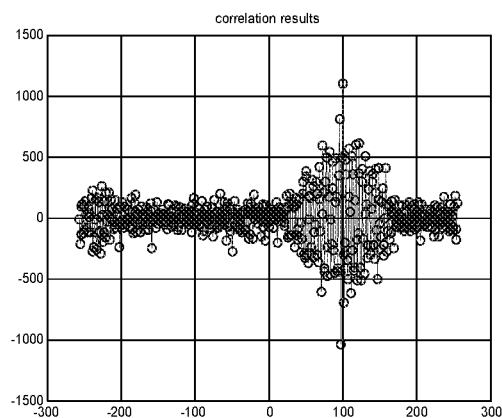
FIG. 6 is a diagram which shows a result curve of cross-correlation in accordance with an embodiment of the present disclosure.

FIG. 6 is a diagram which shows a result curve of cross-correlation in accordance with an embodiment of the present disclosure. As shown in FIG. 6, the result curve of cross-correlation is smooth enough and the peak of the result curve is more outstanding, relative to the result curve shown in FIG. 1.

After the result of the cross-correlation is obtained, the timing misalignment between the two signals is estimated according to the result of the cross-correlation at block 203.

For example, a peak is detected from the result curve of the cross-correlation, and the index of the peak is regarded as the timing misalignment.

As can be seen from the above embodiments, spectra of two signals are widened for timing misalignment estimation before a cross-correlation process and power spectral densities of the two spectrum-widened signals are uniform distributions. Therefore, the result curve of cross-correlation will be smooth enough and the peak of the result curve will be more outstanding. The peak detection will be easier and an accurate time alignment result will be obtained with low complexity. Therefore, it will be appropriate for all types of signals including separated multi-carrier signals.

Second Aspect of Embodiments

A device for timing alignment is provided in an embodiment. The device includes a memory and a processor, the memory containing instructions which, when executed on the processor, cause the processor to perform a method according to the first aspect of embodiments. The same contents as those in the first aspect of embodiments are omitted.

Figure 7:
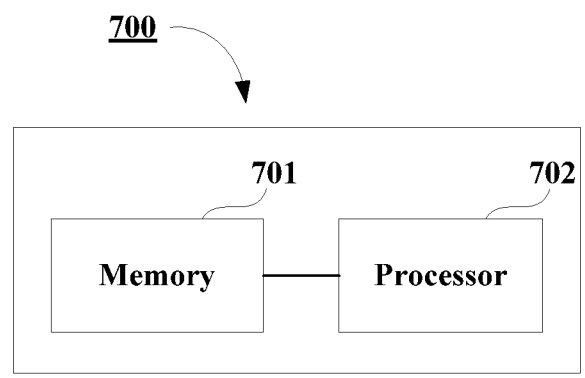
FIG. 7 is a block diagram of a device 700 for timing alignment in accordance with an embodiment of the present disclosure.

FIG. 7 is a block diagram of a device 700 for timing alignment in accordance with an embodiment of the present disclosure.

As shown in FIG. 7, the device 700 includes: a memory 701 and a processor 702. The memory 701 contains instructions which, when executed on the processor 702, cause the processor to: widen spectra of two signals for timing misalignment estimation; perform cross-correlation between the two spectrum-widened signals; and estimate the timing misalignment between the two signals according to a result of the cross-correlation.

In an embodiment, the memory 701 further contains instructions which, when executed on the processor, cause the processor 702 further to: shift the two signals in frequency according to a predetermined shift value and a predetermined stitching number, to obtain the stitching number of signals for the two signals respectively; and stitch the stitching number of signals in frequency for the two signals respectively, to obtain the two spectrum-widened signals.

In an embodiment, the memory 701 further contains instructions which, when executed on the processor, cause the processor 702 further to: shift the two signals in frequency respectively according to n times of the shift value, to obtain (N−1) shifted signals, where n is an integer from 1 to N−1, N is the stitching number, wherein, the signal before shifting and the (N−1) shifted signals constitute the stitching number of signals for the two signals respectively.

In an embodiment, the memory 701 further contains instructions which, when executed on the processor, cause the processor 702 further to: set the stitching number according to a predetermined strategy; and calculate the shift value according to a maximum bandwidth among at least two carriers used for transmitting the two signals and the stitching number.

In an embodiment, the memory 701 further contains instructions which, when executed on the processor, cause the processor 702 further to stitch the stitching number of signals in frequency in a continual mode or a non-continual mode for the two signals respectively.

Figure 8:
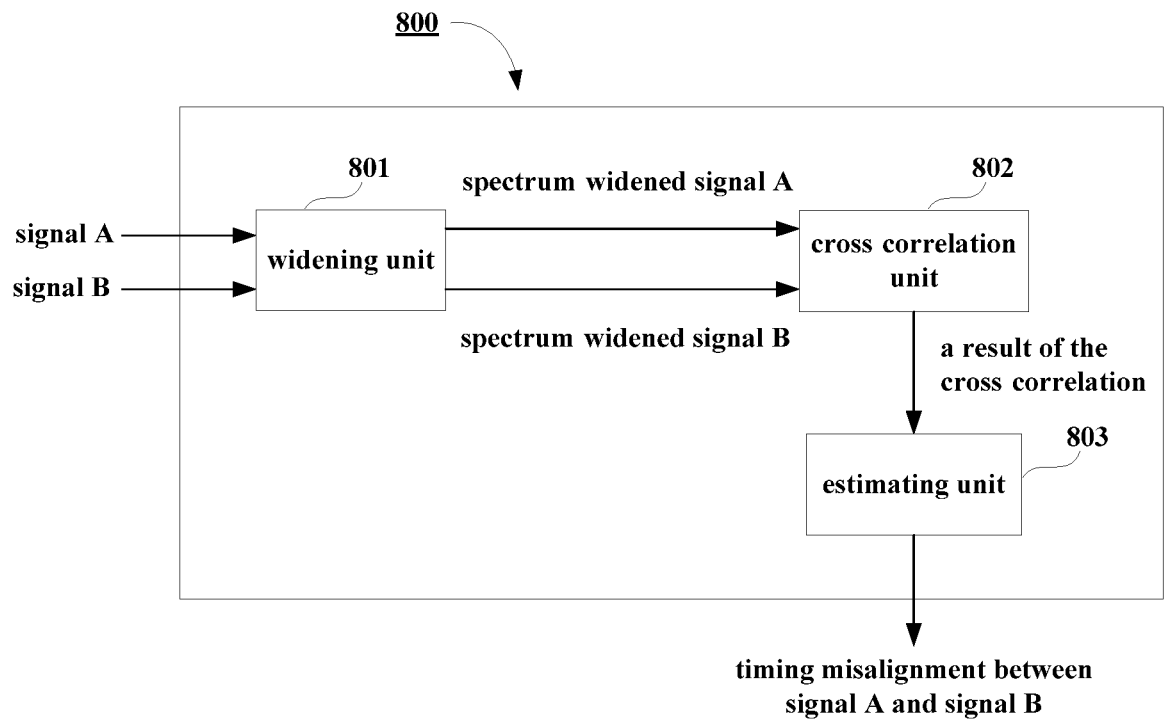
FIG. 8 is another block diagram of a device 800 for timing alignment in accordance with an embodiment of the present disclosure.

FIG. 8 is another block diagram of a device 800 for timing alignment in accordance with an embodiment of the present disclosure.

As shown in FIG. 8, the device 800 includes: a widening unit 801 configured to widen spectra of two signals for timing misalignment estimation; a cross-correlation unit 802 configured to perform cross-correlation between the two spectrum-widened signals; and an estimating unit 803 configured to estimate the timing misalignment between the two signals according to a result of the cross-correlation.

As shown in FIG. 8, two signals input into the widening unit 801 for timing misalignment estimation are signal A and signal B. The widening unit 801 widens spectra of the signal A and signal B, and outputs the spectrum-widened signal A and the spectrum-widened signal B to the cross-correlation unit 802. The cross-correlation unit 802 performs cross-correlation between the spectrum-widened signal A and the spectrum-widened signal B, and outputs a result of the cross-correlation to the estimating unit 803. The estimating unit 803 estimates timing misalignment between the signal A and the signal B according to the result of the cross-correlation, and outputs the timing misalignment between the signal A and the signal B.

It should be appreciated that components included in the device 800 correspond to the operations of the method 200. Therefore, all operations and features described above with reference to FIG. 2 is likewise applicable to the components included in the device 800 and have similar effects. For the purpose of simplification, the details will be omitted.

It should be appreciated that the components included in the device 800 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the device 800 may be implemented, at least in part, by one or more hardware logic components.

For example, the widening unit 801, the cross-correlation unit 802 and the estimating unit 803 may be implemented using the memory 701 and the processor 702 in FIG. 7.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

As can be seen from the above embodiments, spectra of two signals are widened for timing misalignment estimation before a cross-correlation process and power spectral densities of the two spectrum-widened signals are uniform distributions. Therefore, the result curve of cross-correlation will be smooth enough and the peak of the result curve will be more outstanding. The peak detection will be easier and an accurate time alignment result will be obtained with low complexity. Furthermore, it will be appropriate for all types of signals including separated multi-carrier signals.

Third Aspect of Embodiments

A transmitter or receiver is provided in an embodiment. The transmitter or receiver includes a device for timing alignment according to the second aspect of embodiments, and the same contents as those in the second aspect of embodiments are omitted.

Figure 9:
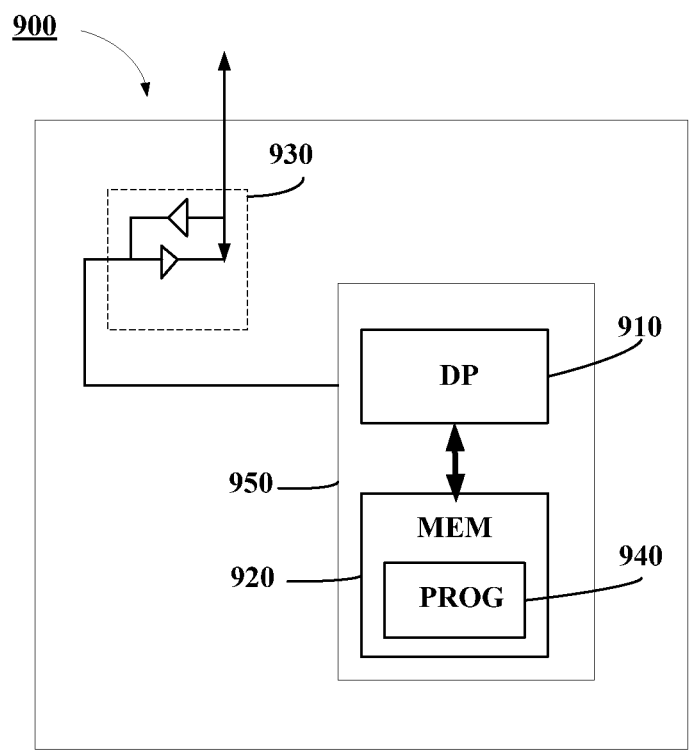
FIG. 9 is a simplified block diagram of a transmitter or receiver 900 that is suitable for implementing embodiments of the present disclosure.

FIG. 9 is a simplified block diagram of a transmitter or receiver 900 that is suitable for implementing embodiments of the present disclosure.

As shown in FIG. 9, the transmitter or receiver 900 includes a communicating means 930 and a processing means 950. The processing means 950 includes a data processor (DP) 910, a memory (MEM) 920 coupled to the DP 910. The communicating means 930 is coupled to the DP 910 in the processing means 950. The MEM 920 stores a program (PROG) 940. The communicating means 930 is for communications with other devices, which may be implemented as a transceiver for transmitting/receiving signals.

The PROG 940 is configured to include program instructions that, when executed by the associated DP 910, enable the transmitter or receiver 900 to operate in accordance with the embodiments of the present disclosure, as discussed herein with the above methods. The embodiments herein may be implemented by computer software executable by the DP 910 of the transmitter or receiver 900, or by hardware, or by a combination of software and hardware. A combination of the data processor 910 and MEM 920 may form processing means 950 adapted to implement various embodiments of the present disclosure.

For example, The PROG 940 may include instructions as contained in the memory 701 in FIG. 7, when executed on the DP 910, cause the DP 910 to: widen spectra of two signals for timing misalignment estimation; perform cross-correlation between the two spectrum-widened signals; and estimate the timing misalignment between the two signals according to a result of the cross-correlation.

In an embodiment, the PROG 940 may further include instructions which, when executed on the processor, cause the DP 910 further to: shift the two signals in frequency according to a predetermined shift value and a predetermined stitching number, to obtain the stitching number of signals for the two signals respectively; and stitch the stitching number of signals in frequency for the two signals respectively, to obtain the two spectrum-widened signals.

In an embodiment, the PROG 940 may further include instructions which, when executed on the processor, cause the DP 910 further to: shift the two signals in frequency respectively according to n times of the shift value, to obtain (N−1) shifted signals, where n is an integer from 1 to N−1, N is the stitching number, wherein, the signal before shifting and the (N−1) shifted signals constitute the stitching number of signals for the two signals respectively.

In an embodiment, the PROG 940 may further include instructions which, when executed on the processor, cause the DP 910 further to: set the stitching number according to a predetermined strategy; and calculate the shift value according to a maximum bandwidth among at least two carriers used for transmitting the two signals and the stitching number.

In an embodiment, the PROG 940 may further include instructions which, when executed on the processor, cause the DP 910 further to stitch the stitching number of signals in frequency in a continual mode or a non-continual mode for the two signals respectively.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the transmitter or receiver 900, there may be several physically distinct memory modules in the transmitter or receiver 900. The DP 910 may be of any type suitable to the local technical environment, and may include one or more of general purpose computers, special purpose computers, microprocessors, digital signal processors (DSPs) and processors based on multicore processor architecture, as non-limiting examples. The transmitter or receiver 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for timing alignment, comprising:
generating two spectrum-widened signals by widening spectra of two signals for timing misalignment estimation;
determining a result of performing cross-correlation between the two spectrum-widened signals; and
estimating the timing misalignment between the two signals based on the result of performing the cross-correlation,
wherein widening the spectra of the two signals comprises stitching a stitching number of signals in a frequency for the two signals respectively to obtain the two spectrum-widened signals.

2. The method of claim 1, wherein widening the spectra of the two signals for the timing misalignment estimation further comprises:
shifting the two signals in the frequency according to a predetermined shift value and a predetermined stitching number, to obtain the stitching number of signals for the two signals respectively.

3. The method of claim 2, wherein shifting the two signals in the frequency according to the predetermined shift value and the predetermined stitching number comprises:
shifting the two signals in the frequency respectively according to n times of the predetermined shift value, to obtain (N−1) shifted signals, where n is an integer from 1 to N−1 and N is the stitching number,
wherein, the two signals before shifting and the (N−1) shifted signals constitute the stitching number of signals for the two signals respectively.

4. The method of claim 2, further comprising:
setting the stitching number according to a predetermined strategy; and
calculating the predetermined shift value according to a maximum bandwidth among at least two carriers used for transmitting the two signals and the stitching number.

5. The method of claim 2, wherein stitching the stitching number of signals in the frequency for the two signals respectively comprises:
stitching the stitching number of signals in the frequency in a continual mode or a non-continual mode for the two signals respectively.

6. The method of claim 1, wherein the two signals comprise at least one of: a transmitted signal and a feedback signal from an observation receiver in a digital pre-distortion ("DPD") system; and a transmitted signal and a received signal in a digital communications system.

7. The method of claim 1, wherein the two signals comprise at least one of: single carrier signals; continual multi-carrier signals; and separated multi-carrier signals.

8. A device for timing alignment, comprising:
processing circuitry; and
memory coupled to the processing circuitry and having instructions stored therein that are executable by the processing circuitry to cause the device to perform operations comprising:
generating two spectrum-widened signals by widening spectra of two signals for timing misalignment estimation;
determining a result of performing cross-correlation between the two spectrum-widened signals; and
estimating the timing misalignment between the two signals based on the result of performing the cross-correlation,
wherein widening the spectra of the two signals comprises shifting the two signals in the frequency according to a predetermined shift value and a predetermined stitching number, to obtain a stitching number of signals for the two signals respectively.

9. The device of claim 8, wherein generating the two spectrum-widened signals further comprises:
stitching the stitching number of signals in the frequency for the two signals respectively, to obtain the two spectrum-widened signals.

10. The device of claim 9, wherein shifting the two signals in the frequency comprises:
shifting the two signals in the frequency respectively according to n times of the predetermined shift value, to obtain (N−1) shifted signals, where n is an integer from 1 to N−1, N is the stitching number,
wherein, the two signals before shifting and the (N−1) shifted signals constitute the stitching number of signals for the two signals respectively.

11. The device of claim 9, the operations further comprising:
setting the stitching number according to a predetermined strategy; and
calculating the predetermined shift value according to a maximum bandwidth among at least two carriers used for transmitting the two signals and the stitching number.

12. The device of claim 9, wherein stitching the stitching number of signals in the frequency for the two signals respectively comprises:
stitching the stitching number of signals in the frequency in a continual mode or a non-continual mode for the two signals respectively.

13. The method of claim 8, wherein the two signals comprise at least one of: a transmitted signal and a feedback signal from an observation receiver in a digital pre-distortion ("DPD") system; a transmitted signal and a received signal in a digital communications system; single carrier signals; continual multi-carrier signals; and separated multi-carrier signals.

14. A non-transitory computer-readable medium having instructions stored therein that are executable by processing circuitry of a device for timing alignment to cause the device to perform operations comprising:
generating two spectrum-widened signals by widening spectra of two signals for timing misalignment estimation;
determining a result of performing cross-correlation between the two spectrum-widened signals; and
estimating the timing misalignment between the two signals based on the result of performing the cross-correlation,
wherein widening the spectra of the two signals comprises stitching a stitching number of signals in a frequency for the two signals respectively to obtain the two spectrum-widened signals.

15. The non-transitory computer-readable medium of claim 14, wherein generating the two spectrum-widened signals comprises:
shifting the two signals in the frequency according to a predetermined shift value and a predetermined stitching number, to obtain the stitching number of signals for the two signals respectively.

16. The non-transitory computer-readable medium of claim 15, wherein shifting the two signals in the frequency comprises:
shifting the two signals in the frequency respectively according to n times of the predetermined shift value, to obtain (N−1) shifted signals, where n is an integer from 1 to N−1, N is the stitching number,
wherein, the two signals before shifting and the (N−1) shifted signals constitute the stitching number of signals for the two signals respectively.

17. The non-transitory computer-readable medium of claim 15, the operations further comprising:
setting the stitching number according to a predetermined strategy; and
calculating the predetermined shift value according to a maximum bandwidth among at least two carriers used for transmitting the two signals and the stitching number.

18. The non-transitory computer-readable medium of claim 15, wherein stitching the stitching number of signals in the frequency for the two signals respectively comprises:
stitching the stitching number of signals in the frequency in a continual mode or a non-continual mode for the two signals respectively.

19. The non-transitory computer-readable medium of claim 14, wherein the two signals comprise at least one of: a transmitted signal and a feedback signal from an observation receiver in a digital pre-distortion ("DPD") system; and a transmitted signal and a received signal in a digital communications system.

20. The non-transitory computer-readable medium of claim 14, wherein the two signals comprise at least one of: single carrier signals; continual multi-carrier signals; and separated multi-carrier signals.

* * * * *